United States Patent Office 3,298,925
Patented Jan. 17, 1967

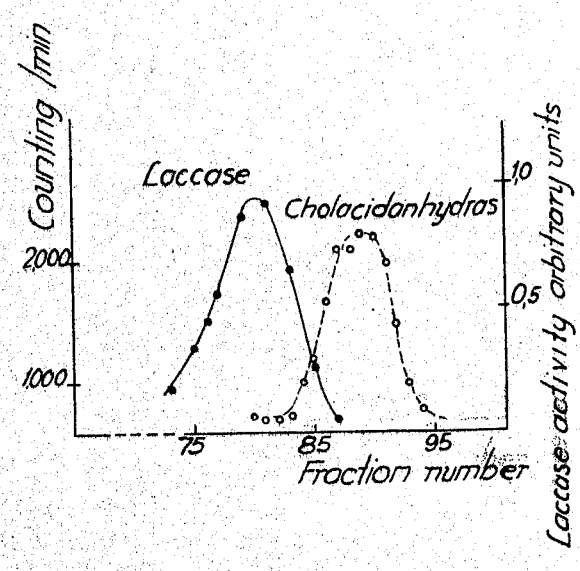

3,298,925
CHROMATOGRAPHIC SEPARATION OF SUBSTANCES OF DIFFERENT MOLECULAR WEIGHT
Karl Theo Rolf Mosbach, Studentstaden 10, Uppsala, Sweden
Filed Dec. 13, 1962, Ser. No. 244,434
Claims priority, application Sweden, Dec. 15, 1961, 12,556/61
4 Claims. (Cl. 195—66)

The present invention relates to a method for the preparation of polymers which are useful for separation, for instance for ion exchange and molecular sieve and particularly for chromatographic purposes and to the polymer products.

It is previously known, for chromatographic purposes, to use gels of carbon hydrate character containing hydroxyl groups such as polysaccharidene dextran, which gels are subjected to cross-linking but when such gels are not stable against proteolytic enzymes they are unsuitable for the intended purpose. However, this is not the case concerning the polymers according to the invention.

The invention now relates to a method of preparing polymers suitable for chromatographic purposes and to the polymer products, said method being characterized in that a C=C-double bonds-containing compound is polymerized in the first place in the presence of a polymerization catalyst, whereafter the polymer obtained is treated with a cross-linking agent, possibly in the presence of a catalyst, whereby the final copolymerized product is obtained.

The method according to the invention may be modified in that a C=C-double bonds-containing compound is copolymerized directly with the cross-linking agent in the presence of a polymerization catalyst.

The C=C-double bonds-containing compounds coming into question are particularly vinyl chloride, vinyl acetate, vinyl ethers, especially vinylethyl ether, allyl derivatives, for instance allyl alcohol and allyl amine, styrene, butadiene, especially acrylic acid, methacrylic acid, crotonic acid and esters, nitriles, and amides thereof, as well as N-dimethyl acrylamides, dimethylaminostyrene, vinylsulphonic acid, and as cross-linking agent there are particularly introduced two C=C-double bonds-containing compounds, for instance esters of methacrylic acid and acrylic acid and crotonic acid with polyvalent alcohols, divinyl benzene, methacrylic acid anhydride, acrylic acid anhydride, N,N'-methylene bisacrylicamide, hydroxyl group and amino group reactive agents such as aldehdes, particularly glyoxal and ketones, aryl dihalogenides, alkyl dihalogenides, disulphohalogenides and polyvalent acids.

As useful compounds there may be mentioned N,N'-dimethylenebisacrylamide, divinyl benzene and glyoxal as cross-linking agents and as polymerization catalyst there can be used per-compounds as ammonium persulphate, benzoyl peroxide, hydrogen peroxide or trialkyl aluminium.

The cross-linking agent is preferably introduced into the copolymer in a quantity of 0.01 to 50, especially 0.5 to 20 or 0.5 to 10 and particularly 1 to 5 percent by weight, calculated on the weight of the copolymer.

The polymerization may be carried out in a liquid medium especially as gel block polymerization or gel pearl polymerization or precipitation polymerization i.e. in the liquid medum. The product obtained after the polymerization is dried, particularly by freeze-drying, but also by vacuum, with solvents which are miscible with the gel medium but not capable of swelling in the polymer by salting out for hydrophilous gels, and is pulverized for instance by means of a ball mill. The gel may also be made homogenous by sieving of small granules which are separated. The product obtained after the pulverization is possibly sieved and is treated with swelling agents, i.e. hydrophilic agents, as water, alcohols, aqueous solutions, cellulose derivatives, starch, polyethylene glycol or hydrophobic agents, for instance benzene, toluene, or xylene. For chromatographic purposes it is obviously necessary that the product should be present in the form of uniform granules so that the solvent with the substances intended for chromatography easily will flow through a column filled with granules. The drying is preferably to be performed in an oxygen-free atmosphere at an elevated temperature.

The gel obtained can, after drying and possible pulverization be modified either by reaction of functional agents with the active groups on the gel granules or by after-polymerization or gel-formation, respectively, of the dry or swelled gel grains.

The polymer produced according to the present invention is particularly useful in granulated form and after swelling in a solvent for separation, especially for chromatographic purposes, for instance for chromatography of high-molecular substances between themselves and high-molecular substances from substances with a somewhat lower molecular weight. With chromatography there is, in a broad sense, also meant the concentration by dehydration and ion-exchange.

In the following there are described examples of the production of the polymers according to the present invention and their utilization for chromatographic purposes.

*Example 1*

4.85 g. acrylamide, 0.15 N,N'-methylenediacrylamide, 0.2 g. ammonium sulphate are added to 100 g. water and agitated. The gel formation takes place in a closed receptacle in an oxygen-free atmosphere at room temperature. Thereafter the gel obtained is dehydrated by vacuum and is pulverized to a granular size of 0.05 mm. in diameter.

*Example 2*

0.75 g. N,N'-methylenebisacrylamide and 24.25 g. acrylamide are added to 500 ml. water. The solution is filtered and deaired by a water pump. A few minutes after the addition of 1.0 g. ammonium persulphate as polymerization catalyst and 1.0 ml. beta-dimethylamino-proprionitrile a stiff gel is formed which is then submitted to freeze-drying. The freeze-dried polymer is thereafter pulverized in a mortar and sieved. Particles with a diameter smaller than 0.05 mm. are collected.

The sieved powder obtained is slowly added with vigorous stirring to 300 ml. of a 0.05 M sodium phosphate buffer solution. Said solution is allowed to stand for one hour and the larger particles are removed as sediment by repeated decantations so as to obtain a particle suspension consisting of particles as uniform as possible. To this end 4 to 5 decantations are required. The smaller particles are also removed by decantation.

*Example 3*

5 g. acryl acid amide and 0.2 g. ammonium persulphate are added to 100 g. water and polymerized at a temperature of 90° C. for a period of 30 minutes. The polymerisate obtained is acidified with HCl to 0.1-n and is reacted with 0.5 g. of a 30% glyoxal as a cross-linking agent. The gel formation occurs at 90° C. during a period of 30 minutes. The gel obtained is then subjected to after-treatment according to the method stated in Example 2 while a swelled powder having a grain size of from 0.02 mm. to 0.05 mm. is formed.

Example 4

4 g. acrylic acid amide, 0.15 g. N,N'-methylene diacrylamide and 0.85 g. acrylic acid are admixed with 2 g. ammonium persulphate in 100 g. water. The gel formation comes about at 90° C. during a period of 60 minutes whereafter the gel obtained is subjected to after-treatment according to Example 2.

Example 5

This example was performed by the method stated in Example 4, except that the acrylic acid was replaced by the same quantity of sodium salt of the vinyl sulphonic acid.

Example 6

This example was performed according to Example 4 except that the acrylic acid was replaced by the same quantity of N-dimethylacrylamide.

Example 7

This example was performed according to Example 4 except that the acrylic acid was replaced by the same quantity of dimethylaminostyrene.

Example 8

This example was performed according to Example 3, except that 40% of the acrylic acid amide was replaced by acrylic acid, vinyl sulphonic acid, N-dimethylacrylamide or dimethylaminostyrene.

Example 9

9.9 g. butylmethacrylate, 0.1 g. divinylbenzene and 0.1 g. benzoylperoxide are admixed with 10 g. diphenyl pentachloride. The gel formation takes place at 50° C. during 24 hours, at 75° C. during 24 hours and at 100° C. during 24 hours and the product is dried.

Example 10

9.9 g. styrene and 0.1 g. divinylbenzene are dissolved in 5 g. diethylbenzene. 0.1 g. benzoylperoxide is added. The polymerization came about at 70° C. during 6 days (6×24 hours).

Example 11

10 ml. vinylethylether, 1 ml. 0.33-molecular triisobutylaluminium, 1 ml. 0.33-molecular titanium tetrachloride and 0.2 ml. divinyl benzene are admixed with 60 ml. xylene. The gel formation is achieved at 30° C. during 20 hours and is subjected to after-treatment.

In the above example the polymerization has been carried out under the formation of a homogeneous block. However, it is also possible, according to the invention to carry out the polymerization as pearl polymerization, the mixture of the compounds intended to be polymerized being separated in a hydrophobic solvent.

Example 12

20 ml. of a mixture of acrylamide, N,N'-methylenediacrylamide and ammonium persulphate in the proportions given in Example 1 are admixed with 400 ml. xylene and with 5% medium viscous polyacrylate as viscosity regulator. The polymerization takes place under stirring and in oxygen-free atmosphere and at a temperature of between 50° C. and 90° C. The grains obtained are filtered and dried.

The following examples describe how the produced polymers are used for chromatographic purposes.

Example 13

The decanted suspension of the hydrated polymer obtained according to Example 2 is introduced into a glass column and is allowed to settle. The sedimentation is made more uniform by agitating the apparatus. When the packing is finished the buffer solution used in hydratizing is replaced by a fresh buffer solution and the column is washed over night and is thereafter ready for use. 40% of the packed bed is a so-called dead volume.

At the top of the column there is a thin layer of buffer solution and under the same the sample is introduced in a thin polyethylene column having an inner diameter of 1 mm.

A mixture of fungal laccase and radioactive carbonic acid anhydrase intended for chromatography was thus layered on the top of the column having the dimensions 1.5 x 22 cm. The volume of the protein solution was 1 ml. and the total amount was about 7 mg. The chromatogram was developed with 0.05 M sodium phosphate buffer solution as eluting agent. The drop rate was 1.8 ml./h. and fractions of about 0.3 ml. were collected. The laccase was localized by enzymatic and the carbonic acid anhydrase by radioactive measurements. The carbonic anhydrase had been made radioactive with $Zn^{65}$ by dialysis against $10^{-4}$ M 1, 10-phenanthroline in 0.1 M acetate buffer pH 5.0 containing $4.10^{-5}$ M $Zn^{65}$ $(Ac)_2$. The results are evident from the accompanying drawing. This test was carried out at room temperature. The excellent separation is clearly evident.

Example 14

R-phycoerythrine (molecular weight 290,000), human haemoglobin (molecular weight 68,000), cytochrome C from horse heart (molecular weight 13,000), DNP-aspartic acid (molecular weight 285) and naphthol green (molecular weight 253) were separated.

To this end there was used a column having the dimensions 1.5 x 32 cm. and a polymer produced according to Example 2. The volume of the sample solution was 1.0 ml. and the protein concentration 1.5%. After 10 hours elution with 0.05 M sodium sulphate buffer at pH 7.3 all components had separated in the same remarkable manner stated for the substances shown on the drawing.

Example 15

This example describes the separation of water from a protein which is dissolved in the form of a solution in water with dry granules of a gel according to Example 3, which granules have been pulverized and reduced to a granule size of 0.02 to 0.06 mm. in diameter. In this connection water is separated from the protein in that the water in eluting is sucked up into the polymer and a concentrated protein solution is obtained which can be separated from the swelled gel granules by centrifuging.

What is claimed is:

1. A method for chromatographic separation of high-molecular substances into fractions and the separation of high-molecular substances from low molecular substances, which comprises passing said substances through a bed of solvent-swollen granules of a polymerization product made by polymerization of a $>C=C<$ double bond-containing compound initially in the presence of a polymerization catalyst and treating the polymer formed with a cross-linking agent in the presence of a polymerization catalyst, the $>C=C<$ double bond-containing compound being selected from the group consisting of acrylic acid, acrylic acid amide, acrylic acid N-dimethylamide, vinyl sulphonic acid, dimethylamino styrene, esters of acrylic acid and vinyl alkyl ethers and using 0.5 to 20% by weight of cross-linking agent in the form of N,N'-dimethylene bisacrylamide, performing the polymerization in a liquid medium as pearl polymerization, the products after the cross-linking, being dried by freeze-drying and thereafter being pulverized, the product after drying and pulverizing being treated with a swelling agent selected from the group consisting of hydrophilic and hydrophobic agents.

2. A method for chromatographic separation of high-molecular substances into fractions and the separation of high-molecular substances from low molecular substances which comprises passing said substances through a bed of solvent-swollen granules of a polymerization product made by direct copolymerization of a $>C=C<$ double bond-containing compound with a cross-linking agent in the presence of a polymerization catalyst wherein the >C=C< double bond-containing compound is selected from the group consisting of acrylic acid, acrylic acid amide, acrylic acid N-dimethylamide, vinyl sulphonic acid, dimethylamino styrene, esters of acrylic acid and vinyl alkyl ethers and using 0.5 to 20% by weight of cross-linking agent in the form of N,N'-dimethylene bisacrylamide, performing the polymerization in a liquid medium as pearl polymerization, the products after the cross-linking being dried by freeze-drying and thereafter being pulverized, the product after drying and pulverizing being treated with a swelling agent selected from the group consisting of hydrophilic and hydrophobic agents.

3. A method for chromatographic separation of high-molecular substances into fractions and the separation of high-molecular substances from low molecular substances, which comprises passing said substances through a bed of solvent-swollen granules of a polymerization product made by polymerization of a >C=C< double bond-containing compound initially in the presence of a polymerization catalyst and the polymer formed being treated with a cross-linking agent in the presence of a polymerization catalyst, the >C=C< double bond-containing compound being selected from the group consisting of acrylic acid, acrylic acid amide, acrylic acid N-dimethylamide, vinyl sulphonic acid, dimethylamino styrene, esters of acrylic acid and vinyl alkyl ethers and using 0.5 to 20% by weight of cross-linking agent in the form of glyoxal, performing the polymerization in a liquid medium as pearl polymerization, the products after the cross-linking being dried by freeze-drying and thereafter being pulverized, the product after drying and pulverizing being treated with a swelling agent selected from the group consisting of hydrophilic and hydrophobic agents.

4. A method for chromatographic separation of high-molecular substances into fractions and the separation of high-molecular substances from low molecular substances which comprises passing said substances through a bed of a solvent-swollen granules of a polymerization product made by direct copolymerization of a >C=C< double bond-containing compound with a cross-linking agent in the presence of a polymerization catalyst wherein the >C=C< double bond-containing compound being selected from the group consisting of acrylic acid, acrylic acid amide, acrylic acid N-dimethylamide, vinyl sulphonic acid, dimethylamino styrene, esters of acrylic acid and vinyl alkyl ethers and using 0.5 to 20% by weight of cross-linking agent in the form of glyoxal, performing the polymerization in a liquid medium as pearl polymerization, the products after the cross-linking being dried by freeze-drying and thereafter being pulverized, the product after drying and pulverizing being treated with a swelling agent selected from the group consisting of hydrophilic and hydrophobic agents.

References Cited by the Examiner
UNITED STATES PATENTS

| | | | |
|---|---|---|---|
| 2,474,807 | 7/1949 | Schoene | 260—880 |
| 2,908,659 | 10/1959 | Shashoua | 260—29.6 |
| 3,134,814 | 5/1964 | Sargent et al. | 210—31 |

OTHER REFERENCES

Weissberger et al. part I, Separation and Purification, volume 3, Interscience Publishers, Inc., New York, 1956. Qd. 251 W44 1949, pps. 831–837. Copy in group 140.

MURRAY TILLMAN, *Primary Examiner.*

SAMUEL H. BLECH, *Examiner.*

W. J. BRIGGS, *Assistant Examiner.*